United States Patent [19]

Begin

[11] Patent Number: 5,680,041
[45] Date of Patent: Oct. 21, 1997

[54] MAGNETOSTRICTIVE POSITION MEASUREMENT APPARATUS WITH ANTI-REFLECTION WAVEGUIDE TERMINALS

[75] Inventor: John D. Begin, Sterling Heights, Mich.

[73] Assignee: Patriot Sensors and Controls Corporation, Clawson, Mich.

[21] Appl. No.: 615,488

[22] Filed: Mar. 12, 1996

[51] Int. Cl.$^6$ .................. G01B 7/14; G01F 23/30; H03H 9/22
[52] U.S. Cl. .................. 324/207.13; 73/290 V; 324/207.12; 333/148
[58] Field of Search .................. 324/207.12, 207.13, 324/207.17, 207.22, 207.24; 73/313, 314, 319, 290 V, DIG. 2, DIG. 5; 333/148

[56] References Cited

U.S. PATENT DOCUMENTS

| | | | |
|---|---|---|---|
| 4,839,590 | 6/1989 | Koski et al. | 333/148 X |
| 4,943,773 | 7/1990 | Koski et al. | 324/207.13 |
| 4,958,332 | 9/1990 | Tellerman | 324/207.13 X |
| 5,017,867 | 5/1991 | Dumais et al. | 324/207.13 |
| 5,050,430 | 9/1991 | Begin et al. | 324/207.13 X |
| 5,076,100 | 12/1991 | Hunter et al. | 324/207.13 X |
| 5,196,791 | 3/1993 | Dumais | 324/207.13 |
| 5,212,444 | 5/1993 | Abramovich et al. | 324/207.11 |
| 5,258,707 | 11/1993 | Begin et al. | 324/207.13 |
| 5,274,328 | 12/1993 | Begin et al. | 324/207.12 |
| 5,406,200 | 4/1995 | Begin et al. | 324/207.12 |
| 5,412,316 | 5/1995 | Dumais et al. | 324/207.13 |
| 5,545,984 | 8/1996 | Gloden et al. | 324/207.13 |

Primary Examiner—Gerard R. Strecker
Attorney, Agent, or Firm—Young & Basile, P.C.

[57] ABSTRACT

A magnetostrictive waveguide type position measuring system wherein the wire waveguide is mounted within a small diameter brass tube which, in turn, is mounted by way of resilient suspension components within a rigid outer tube affixed to a position reference frame. The resilient components isolate the waveguide from relatively high frequency shock inputs characteristic of rough environment applications. The waveguide is made of rolled and drawn wire with a round section, but the terminal ends are gradually reconfigured from round to flat, rectangular sections and are sandwiched between acoustic dampening pads to reduce or eliminate sonic reflections.

4 Claims, 3 Drawing Sheets

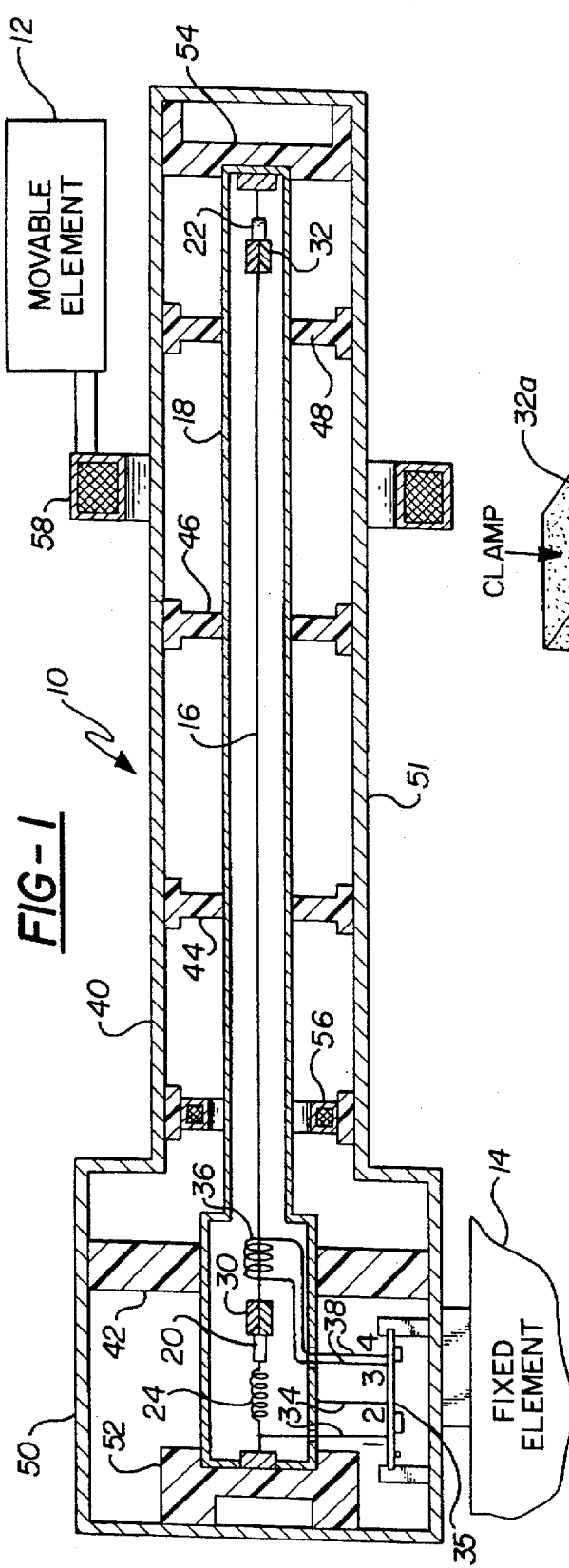
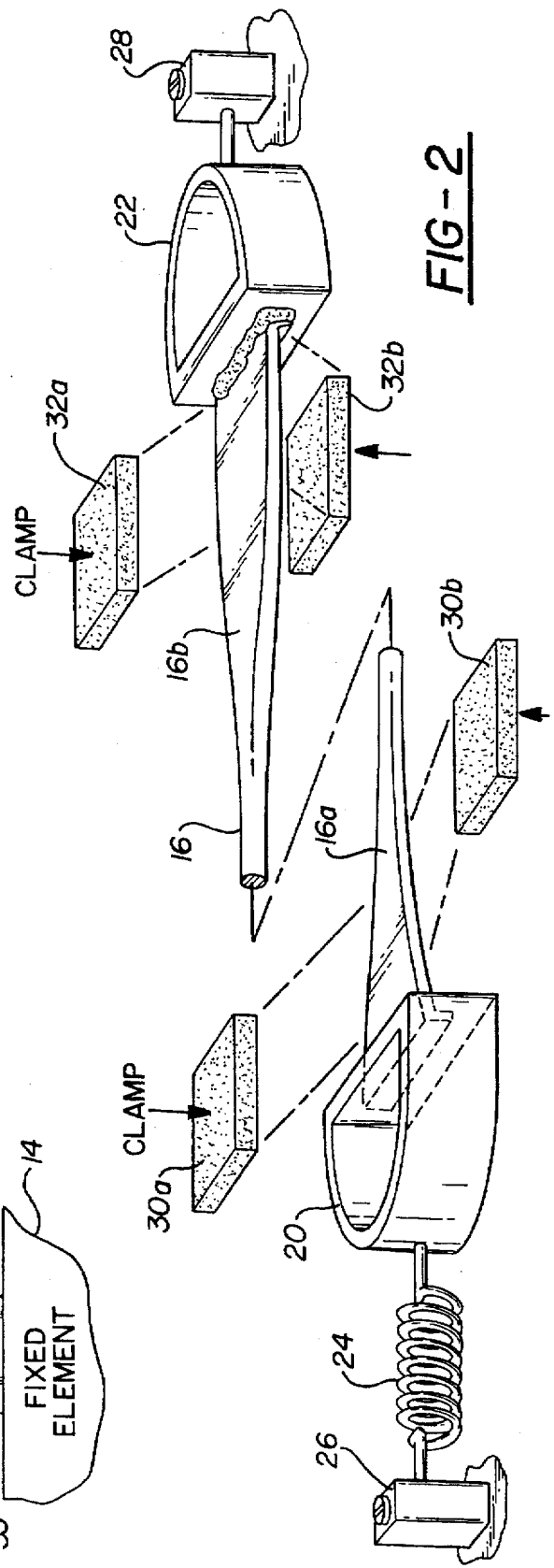

MAGNETOSTRICTIVE POSITION MEASUREMENT APPARATUS WITH ANTI-REFLECTION WAVEGUIDE TERMINALS

RELATED APPLICATIONS

This application is related to copending applications "Position Measurement Apparatus Using Wire Waveguide in Shock Resistant Suspension and Method of Using Same," Serial No. 08/615,489 and "Magnetostrictive Position Measurement Apparatus Using Wire Waveguide in Shock Resistant Suspension and Method of Using Same," Serial No. 08/615,487, both filed simultaneously herewith by John D. Begin and assigned to Patriot Sensors and Controls, Inc.

1. Field of the Invention

This invention relates to position measurement apparatus of the type utilizing a magnetostrictive wire waveguide which extends through a measurement field and in which the position of a movable element within the field is determined as a function of the propagation times of sonic disturbances along the waveguide. A feature of the invention is the provision and use of special waveguide terminations to reduce sonic reflections at the terminal ends.

2. Background of the Invention

The use of a magnetostrictive wire waveguide to measure the position of a moveable element such as a machine tool component or a float is described in the prior art including, by way of example, U.S. Pat. No. 4,839,590 issued Jun. 13, 1989 to Richard Koski, William Kosco, and Arthur Dumais and assigned by mesne assignments to Patriot Sensors, Inc. of Clawson, Mich. In general, the magnetostrictive wire waveguide extends through the measurement field and cooperates with a toroidal "user" magnet which is moveable along and in surrounding relationship to the waveguide, the position of the user magnet being related to the position of a quantity or component being monitored. Although the specific manner of using a magnetostrictive waveguide as a position transducer may vary, the measurement function in all cases involves a determination of the time required for a sonic disturbance to propagate along the waveguide from a fixed position at or near one end of the waveguide and the user magnet or vice versa. Since the propagation speed is known, distance can be determined as a function of time.

Magnetostrictive wire waveguide position measurement devices generally employ a nickel alloy wire of nominally circular cross-section the ends of which are anchored so that the wire waveguide extends through the measurement field. The measurement field may be of any given or desired length and typical examples in industrial applications run anywhere from a few inches to more than two hundred feet. These are merely examples and are not intended as limitations. The wire waveguide is typically straight and held in spaced relation to the inner surface of a surrounding tube by end anchors and a tension spring. Non-straight waveguide orientations and mounts, however, are also possible. At any given length, because the measurement technique utilized with the magnetostrictive wire waveguide involves a determination of the propagation times of sonic disturbances or impulses in the waveguide, it is generally important to be able to distinguish between primary sonic disturbances which travel directly from the position of the moveable magnet and reflections of those disturbances from the anchor or termination points of the wire waveguide. It is normally desirable, therefore, to reduce or eliminate any such reflections.

SUMMARY OF THE INVENTION

In accordance with the invention described herein, reflections of sonic disturbances from the terminations of a magnetostrictive wire waveguide are substantially reduced or eliminated. In general this is accomplished by arranging a magnetostrictive wire waveguide such that a major portion having a substantially uniform cross section extends through the measurement field for active association with one or more user magnets to generate sonic disturbances in the waveguide, and providing the waveguide with at least one terminal portion having a cross section of substantially different shape or configuration from that of the major portion. The waveguide configuration changes gradually, rather than abruptly, from one configuration to the other, over a linear distance with a substantial multiple of the nominal diameters.

In the illustrative embodiment described herein, the waveguide has a major portion of round or circular section created by conventional rolling and wire drawing techniques and a nominal diameter of 0.025 inches. The terminal ends transition gradually into a flat rectangular configuration created by gradual mechanical working of the original wire or, in the case of a wire which is cold-worked from flat stock, by omitting to work the ends of the stock into a wire form. The length of the transition may be a multiple of the original wire diameter; e.g., for a two-inch transition, the ratio of transition length to nominal diameter is 80, however, much smaller ratios are usable.

The reflection-dampening performance of the terminal ends can be enhanced by contacting the ends with resilient material such as rubber. In the illustrative embodiment, pads of rubber or other resilient material are clamped on opposite sides of the flattened terminal ends in sandwich fashion to produce a dampening effect which can reduce reflections to as little as 1/100th of the original wave amplitude.

These and other features and advantages of the present system will be apparent from a reading of the following specification which describes an illustrative embodiment in detail.

BRIEF DESCRIPTION OF THE DRAWINGS

FIG. 1 is a cross-sectional view of a wire waveguide position measurement apparatus illustrating the waveguide shock resistant suspension system for the waveguide;

FIG. 2 is an exploded perspective view of the wire waveguide emphasizing the reflection resistant termination configuration details;

DETAILED DESCRIPTION OF THE ILLUSTRATIVE EMBODIMENT

Figure 3:
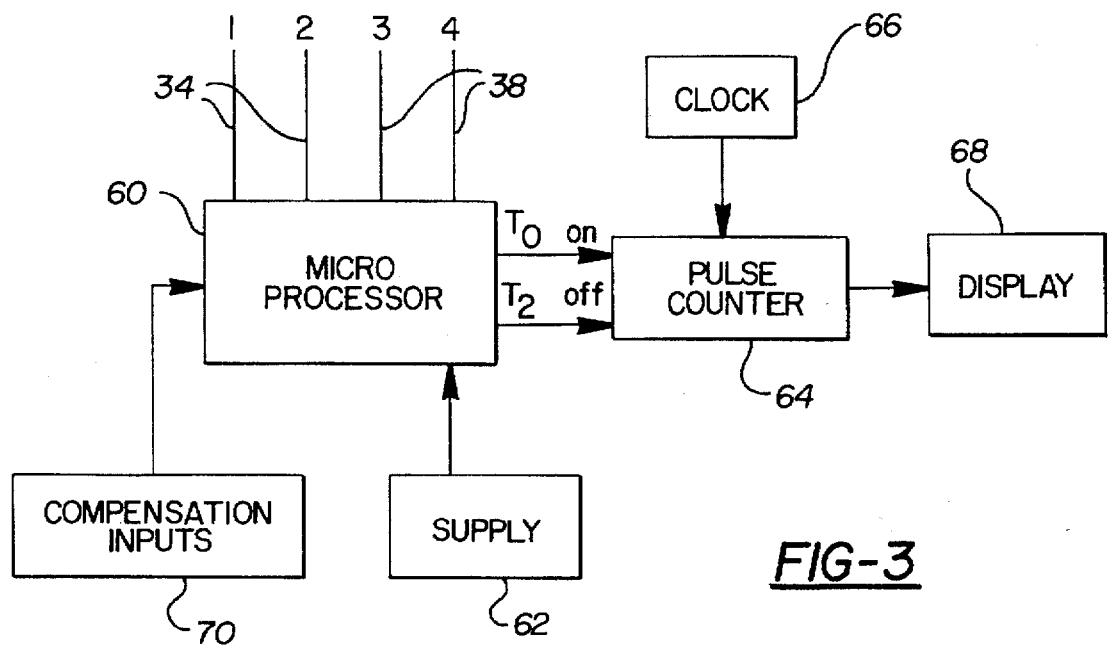
FIG. 3 is a schematic block diagram of the signal processing system utilized with the apparatus of FIG. 1.

Referring to FIGS. 1 and 2 there is shown a magnetostrictive wire waveguide type position measurement apparatus 10 for determining the position of a moveable element 12 relative to a fixed or reference element 14. It will be appreciated that the moveable and fixed elements 12 and 14 are representative of wide variety of elements, components or quantities associated with various specific applications; by way of example, the moveable element 12 may be a metal cutter mounted to be precisely moved relative to a machine frame or base represented by fixed element 14. As another example, the moveable element 12 may represent a blade or shovel which is controllable as to position relative to the frame of the vehicle, said frame being represented by the fixed element 14.

Measurement apparatus 10 comprises a magnetostrictive wire waveguide 16 in the form of a 0.025" diameter cold-worked nickel iron alloy wire extending linearly and under tension through a measurement field of appropriately chosen length. Wire waveguide 16 is mounted concentrically within a 0.125" outer diameter brass tube 18 by way of shackles 20 and 22. Shackle 20 is used as a coupling between the wire waveguide 16 and a compression spring 24 which in turn is secured to an anchor 26 shown in FIG. 2, the spring serving to apply appropriate tension to the waveguide essentially to maintain its physical straightness through the interior of the brass tube 18; i.e., the tension applied to the tube is essentially unrelated to the propagation speed of sonic impulses therethrough as hereinafter discussed. Shackle 22 also serves as a coupling between the wire waveguide 16 and a connecting element which is secured to the brass tube by anchor 28 also shown in FIG. 2. The wire waveguide 16, the shackles 20 and 22, the spring 24 and the brass tube 18 are all conductive so that an electrical circuit is established between terminals numbered 1 and 2 on the ends of signal input wires 34 which are connected to electronics circuit board 35 hereinafter described with reference to FIG. 3. Reflection damping pads 30 and 32 of silicon rubber or other appropriate resilient material are clamped about the terminal ends of the wire waveguide 16 for reflection damping purposes as is better described below with reference to FIG. 2. A pick-up coil 36 surrounds the wire waveguide 16 near the left terminal end as shown in FIG. 1 and is connected by conductive wires 38 for connection to circuit board 35.

The arrangement and dimensions given above are examples only. The waveguide, for example, need not be linear but may be curved to accommodate a given measurement field.

The brass tube 18 containing waveguide 16 is resiliently mounted within a steel outer housing 40 having a head 50 and a body 51 of generally tubular configuration by means of washer or disk shaped silicon rubber suspension components 42, 44, 46, and 48 of silicon rubber or other resilient material. Rubber acoustic dampening end structures 52 and 54 are provided between the ends of the brass tube 18 and the ends walls of the steel housing 40 to provide resilient suspension in the axial or longitudinal direction. The material and physical properties; i.e., the shape, density and resilience of the acoustic dampening suspension system components 42, 44, 46, 48, 52, and 54 can be chosen to filter out or dampen shock inputs in almost any selected frequency range which is expected in the environment of use. As a general proposition, the material of the suspension system components is chosen to filter out relatively high frequency shock inputs; e.g., those having a characteristic frequency above 200 hertz.

The configurations of the suspension system components in FIG. 1 are intended as examples for illustration only and it will be appreciated by those skilled in the applicable arts that other configurations can be chosen in accordance with the configuration of the anchoring and housing structures associated with a particular waveguide apparatus. In general, it is the objective of the suspension system to isolate the wire waveguide 16 from externally created or applied shock inputs along all three axes; i.e., the longitudinal axis and the radial axis. The effect of "floating" the wire waveguide 16 and its support tube 18 within the fixed external housing 40, however, requires special considerations insofar as position measurement accuracy is concerned as hereinafter described.

As mentioned above, the waveguide 16 serves as a transducer which extends under tension through the measurement field. For this purpose, a first toroidal magnet 56 is mounted within and to the internal cylindrical surface of the steel housing 10 at a point spaced longitudinally from but near the left end of the wire waveguide 16 as shown in FIG. 1; i.e., near the end at which the pick-up coil 36 is located. Magnet 56 is preferably an electromagnet which is excited only when a measurement is underway. However, it may also be a permanent magnet and need not be within the housing 40. In all cases, however, magnet 56 is a position "reference" magnet and is fixed relative to the measurement field.

A second toroidal permanent magnet 58, herein referred to as a "user magnet," is disposed around the cylindrical body 51 of the steel housing 40 in spaced relationship thereto and is moveable longitudinally or axially along the tube 40 and the wire waveguide 16 by virtue of being mechanically attached to the moveable element 12 the position of which is to be monitored. This mechanical connection can take a variety of forms as described briefly above. The advantages of the shock filtering suspension system are, of course, greatest in environments which involve a likelihood of shock or vibration.

In general, the operation of the device shown in FIG. 1 entails the application of a current pulse to the wire waveguide 16 by way of input wires 34. This current pulse reacts to the magnetic fields created by the reference and user magnets 56 and 58, respectively, to create essentially simultaneous sonic disturbances or impulses in the wire waveguide which propagate linearly in both directions. The pick-up coil 36 receives the sonic disturbance from the reference magnet 56 first in time and calculates its propagation time for purposes hereinafter described. Coil 36 receives the sonic disturbance associated with user magnet 58 second in time, the interval between the arrival of the impulse from reference magnet 56 and the arrival of the pulse from user magnet 58 being a function of the axial position of magnet 58 along the outside surface of the tube 40. Because sonic propagation speed in waveguide 16 is known, the time between the arrivals of the pulses is an indication of the position of the moveable element 12 relative to the magnet 56 and the fixed element 14 on which the housing 40 is carried. Using apparatus and methods hereinafter described, the exact length of the time interval is determined and the position of the moveable element 12 is either recorded or displayed, the term "display" being used herein to represent any effective utilization of the position signal output.

Figure 6:
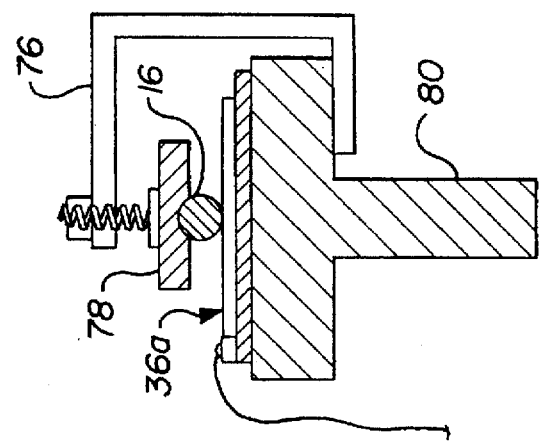
FIGS. 5 and 6 are cross-sectional views of the apparatus of FIG. 1 with an alternative signal pickup.
Figure 5:
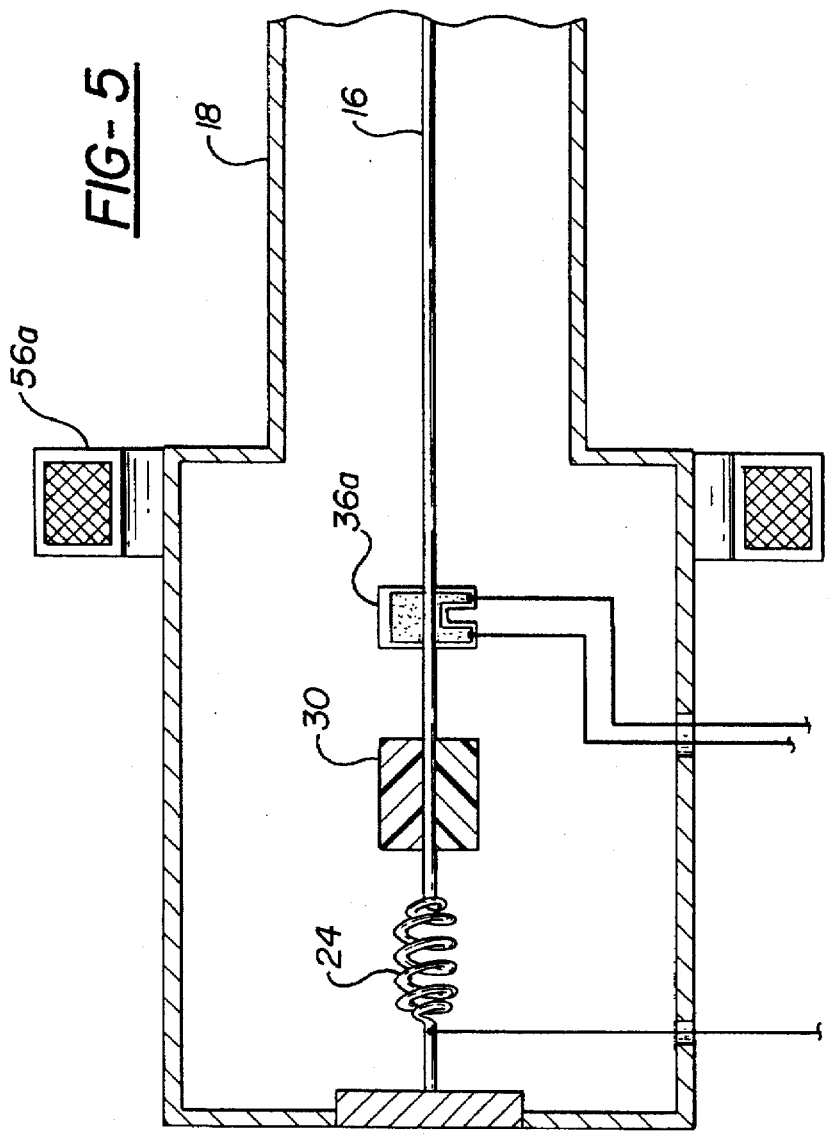

FIGS. 5 and 6 illustrate a portion of the apparatus of FIG. 1 using an alternative form of signal pickup 36a and a relocated reference magnet 56a. Pickup 36a comprises a thin film of piezoelectric material on a pliable carrier. The pickup is clamped against waveguide 16 such that the sonic disturbances, essentially a torsional twist which propagates along the waveguide, locally stretches and strains the piezoelectric material sufficiently to produce an output in the 10–100 mv range. Suitable film-type piezoelectric transducers are available from AMP Incorporated of Valley Force, Pa. under the product designation LDTL-028K.

The piezoelectric pickup 36a permits the reference magnet 56a to be moved to a location very close to the pickup 36a; i.e., a location which would place the conventional coil pickup 36 of FIG. 1 in the magnetic field and create a risk of signal degradation. The film pickup 36a, therefore, allows for a more compact product design.

FIG. 6 shows the pickup 36a mounted on a rigid base 80 which is integrated with housing 18. A compliant pad 78 and a clamp 76 holds the waveguide 16 against the surface of the piezoelectric pickup.

Referring now to FIG. 2, the physical configuration of the wire waveguide 16 and particularly the left and right terminal ends thereof are shown in detail. The wire waveguide which, as mentioned above, can be effectively any desired length, is nominally of circular or round cross section throughout the measurement field. However, to reduce the amplitude of the reflections of sonic disturbances propagating along the waveguide from the terminal ends thereof, the left and right terminal portions 16a and 16b, respectively, which lie outside of the measurement field; e.g., end portions of approximately 1"–3" in length, are mechanically physically altered in section into a gradually flattened and widened shape. These terminal end portions are attached, such as by soldering, to the end surfaces of the conductive shackles 20 and 22 as shown in FIG. 2. Obviously, other attachment mechanicals can be employed. It has been found that a gradual rather than an abrupt change in waveguide wire configuration reduces the tendency of the waveguide material to reflect sonic disturbances propagating along the wire. The term "gradual" means that the cross-sectional shape change occurs over a length which is greater than and, typically, a multiple of the nominal wire diameter. Moreover, the change from a circular or round configuration to a flat, widened, essentially rectangular configuration over a distance which is large relative to the diameter of the wire changes significantly the surface area to volume ratio of the wire material and provides a large surface area for physical contact with pads 30a, 30b and 32a, 32b at the left and right terminal ends of the wire 16, respectively. The pads 30 and 32 are clamped into a contacting configuration which sandwiches the flattened portions 16a and 16b of the wire waveguide 16 therebetween. The result is a substantial reduction in sonic reflection at the terminal ends and a simplification of the signal processing circuitry as hereinafter described. The shape transition of the terminal ends of the waveguide 16 has been found to provide reflection dampening ratios of up to 100:1 as compared with prior art anti-reflection techniques which provide ratios of only about 20:1. Moreover, the flattened sections 16a and 16b have been found to be far less sensitive to clamping pressure and, therefore, give rise to relaxed construction requirements and greater uniformity in product performance. Coil 36 is spaced far enough from left end of waveguide 16 to be around the uniform 0.025" diameter portion thereof.

Turning now to FIG. 3, the details of a signal processing system mounted on circuit board 35 for producing position signal outputs are shown. The signal processing circuitry comprises in principal part a conventional programmable digital microprocessor 60 which is connected through appropriate signal conditioning circuitry apparent to those skilled in the electronics arts to receive the input signal on wires 34 which is used to excite the wire waveguide 16 as previously described. Microprocessor 60 is connected to receive as inputs the pulses which are generated in pick-up coil 36 as the sonic disturbances from the magnets 56 and 58 propagate along the wire waveguide 16 from right to left as shown in FIG. 1. The signal processing described herein can be accomplished with electronics other than a digital computer; for example, hardwired, analog devices can be used. The terms "computer" and "microprocessor," as used herein, are not to be construed only to describe digital or even programmable devices.

Figure 4:
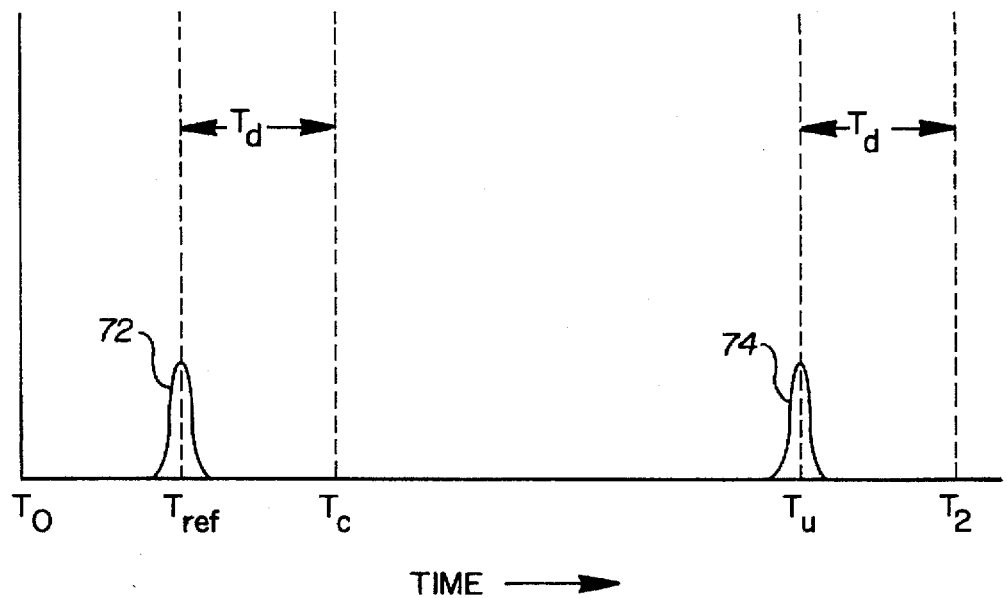
FIG. 4 is a timing diagram for use in explaining the operation of the system of FIG. 3.

As shown in FIG. 4 the occurrence of the excitation signal occurs at $T_0$ and begins the first of repetitive timing cycles. The excitation signal is applied to the ON input of a pulse counter 64 which receives and counts high frequency signals from clock 66. Position resolution is a function of the frequency of clock 66 and, therefore, it is usually chosen to run as fast as possible. At some point after the occurrence of the excitation signal at $T_0$ the first sonic disturbance from the reference magnet 56 arrives at the coil 36 and results in an output voltage pulse 72 at a time $T_{ref}$. But for the shock dampening suspension of the apparatus shown in FIG. 1 $T_{ref}$ would always occur in fixed time relationship to $T_0$; i.e., at a time related to the physical distance between the centerline of the reference magnet 56 and the location of the pick-up coil 36. The suspension system, however, permits the brass tube 18 and the concentrically mounted wire waveguide 16 therein to "float" relative to the outer housing 40 and this gives rise to small but significant changes in the distance between the centerline of magnet 56 and the pick-up coil 36 at any given time. For example, if the outer housing 40 is mounted such that the longitudinal axis thereof coincides with the longitudinal axis of an off-road vehicle to which the measurement apparatus 10 is affixed, accelerations and decelerations of the vehicle can cause the tube 18 to shift within the tube 40. A shift of the tube 18 to the right as seen in FIG. 1 has the effect of shortening the propagation time of the impulse 72 from the reference magnet 56 to the pickup 36.

Although mounting magnets 56 and 58 relative to the same reference frame nulls out the effects of shifting tube 18 on signal accuracy, it is desirable for reasons hereinafter explained to add an increment of time, herein called a "delay interval," to the propagation time of the impulse 74 from the user magnet. The greater the shift to the right, the greater the time increment which must be added to the user magnet impulse propagation time. Conversely, a shift of tube 18 to the left increases the propagation time of the reference signal and requires a smaller delay interval to be added to the user magnet impulse propagation time.

Accordingly, the time difference between the propagation time of the reference impulse 72 to coil 36 and a constant is determined. This quantity is used in microprocessor 60 to calculate a complemental interval, $T_d$, which is thereafter added to time $T_u$ at which a voltage impulse 74 representing the arrival of the sonic propagation from magnet 58 at the coil 36 occurs; FIG. 4 shows that the calculated interval $T_2$ is added to $T_u$ to derive a delayed pulse at time $T_u$ which is applied to the OFF input of the pulse counter 64 to terminate counting pulses from the clock 66. The pulse count between $T_2$ and $T_0$ is used to produce an output which is applied to the display 68 to determine the position of the magnet 58 relative to the fixed reference.

Using arbitrary numbers for illustration, suppose the propagation time $T_{ref}$ of the reference impulse 72 is nominally 5 units when the suspension is unflexed. Suppose further that a shift of the position of tube 18 to the right occurs and the propagation time of impulse 72 to the coil 36 is shortened to four units. The complement of four relative to a constant ten is six and, therefore, six units are added by the microprocessor 60 to the user impulse propagation time $T_u$ to compensate for the shift. If a greater shift to the right shortens the propagation time to three units, a seven nit delay $T_d$ is calculated and added to $T_u$. Conversely, shifts to the left produce shorter delay intervals Td. This is achieved by a programmable logic chip or a simple microprocessor.

In brief, the user magnet signal propagation time is delayed by the complement of the calculated longitudinal waveguide shift, if any, due to the shock-dampening suspension system and the result is used to compensate user magnet position.

As shown in FIG. 3, the system with which the device of FIG. 1 is used also includes transducers such as thermometers and pressure transducers, collectively represented at 70, to produce additional compensation signal inputs in a format which are compatible with the logic signal levels utilized by microprocessor 60. Those inputs are used during the delay time interval $T_d$ between $T_u$ and $T_2$ to perform compensations as necessary to adjust the timing interval and the display of a calculated signal position which is derived therefrom.

It will be appreciated that the suspension system which damps out relatively high frequency shock type inputs and prevents those inputs from reaching the wire waveguide 16 eliminates noise in the form of shock inputs to the waveguide 16 that might be recognized by the coil 36 as sonic signal quantities which are deliberately created by interaction of a current pulse through the wire and the fields created by magnets 56 and 58. The elimination of this significant noise source not only permits the utilization of the magnetostrictive wire waveguide measurement system in applications where the use environment is conducive to shock inputs but also simplifies the filtering and signal processing circuitry required in association with the microprocessor 60. It will be appreciated that this suspension system is of value in connection with magnetostrictive wire waveguide signal processing techniques other than that specifically disclosed herein.

It will also be appreciated that the termination configurations for the waveguide wire which are shown in FIG. 2 of the drawing are effective in reducing reflections and, therefore, eliminating the ambiguities which can be created from the reflection of sonic disturbances in the wire from the opposite end terminals. Again, this improvement is of practical value independently of the shock dampening suspension system and/or any particular type of signal processing protocol.

I claim:

1. In a position measurement device of the type comprising a magnetostrictive wire waveguide extending through a measurement field and at least one magnet disposed in surrounding relationship to said waveguide for producing sonic disturbances therein, the improvement which comprises:

said wire waveguide having substantially throughout the measurement field a substantially uniform first cross-sectional configuration, at least one terminal end thereof having a second cross-sectional configuration different from said first configuration, and a gradual transition from the first to the second configuration, the length of the transition being greater than the nominal sectional dimension of the waveguide in the measurement field.

2. Apparatus as defined in claim 1 further including acoustic damping material contacting said terminal end.

3. Apparatus as defined in claim 1 wherein the first configuration is round and the second configuration is flat.

4. Apparatus as defined in claim 3 further including acoustic dampening pads contacting said terminal ends.

* * * * *